US012673557B2

(12) United States Patent (10) Patent No.: US 12,673,557 B2

Fukuoka (45) Date of Patent: Jul. 7, 2026

(54) CONTROL METHOD AND CONTROL DEVICE FOR MOTOR OF ELECTRIC VEHICLE, AND ELECTRIC VEHICLE INCLUDING CONTROL DEVICE

(71) Applicant: KAWASAKI MOTORS, LTD., Akashi (JP)

(72) Inventor: Rui Fukuoka, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 154 days.

(21) Appl. No.: 18/737,065

(22) Filed: Jun. 7, 2024

(65) Prior Publication Data

US 2024/0408971 A1 Dec. 12, 2024

(30) Foreign Application Priority Data

Jun. 8, 2023 (JP) ................................. 2023-094974

(51) Int. Cl.
*B60L 15/02* (2006.01)
*B60L 58/10* (2019.01)

(52) U.S. Cl.
CPC ............. *B60L 15/025* (2013.01); *B60L 58/10* (2019.02); *B60L 2240/549* (2013.01)

(58) Field of Classification Search
CPC ... B60L 15/025; B60L 58/10; B60L 2240/549
See application file for complete search history.

(56) References Cited

U.S. PATENT DOCUMENTS

| | | | | |
|---|---|---|---|---|
| 4,423,362 | A * | 12/1983 | Konrad | ................... B60L 15/08 388/903 |
| 5,934,398 | A * | 8/1999 | Hotta | ................... B60L 15/2009 318/434 |
| 9,211,803 | B2 * | 12/2015 | Yonehana | ............. B60L 3/0084 |
| 11,932,116 | B1 * | 3/2024 | Secrest | ................. B60L 15/025 |
| 2011/0257825 | A1 * | 10/2011 | Yamamoto | ............. B60L 50/16 180/65.285 |
| 2011/0260659 | A1 | 10/2011 | Kamachi | |
| 2013/0316871 | A1 * | 11/2013 | Shiiba | ................... B60W 10/115 477/15 |

(Continued)

FOREIGN PATENT DOCUMENTS

| | | |
|---|---|---|
| JP | 2010-233396 A | 10/2010 |
| WO | 2023/033762 A1 | 3/2023 |

OTHER PUBLICATIONS

European Patent Office, Extended European Search Report, Application No. 24180658.7, dated Oct. 28, 2024, in 11 pages.

*Primary Examiner* — Gertrude Arthur Jeanglaude
(74) *Attorney, Agent, or Firm* — PROCOPIO, CORY, HARGREAVES & SAVITCH LLP

(57) ABSTRACT

There are provided a control method and a control device for a motor of an electric vehicle. The control method includes: setting a current-related upper limit value of a current-related value related to a current flowing through a battery of the electric vehicle in accordance with a vehicle state when the electric vehicle is driven by the motor; and calculating a torque upper limit value of a command torque for commanding the motor to maintain a state where the current-related value is equal to or less than the current-related upper limit value, based on an accelerator operation amount input to the electric vehicle and the current-related upper limit value.

19 Claims, 9 Drawing Sheets

(56)          References Cited

U.S. PATENT DOCUMENTS

2014/0097676 A1*   4/2014   Kusumi  ................. B60L 50/16
                                                                         307/10.1
2022/0077795 A1    3/2022   Ko et al.

* cited by examiner

SOC

I1

I2

I3

TEMPERATURE

*FIG. 9*

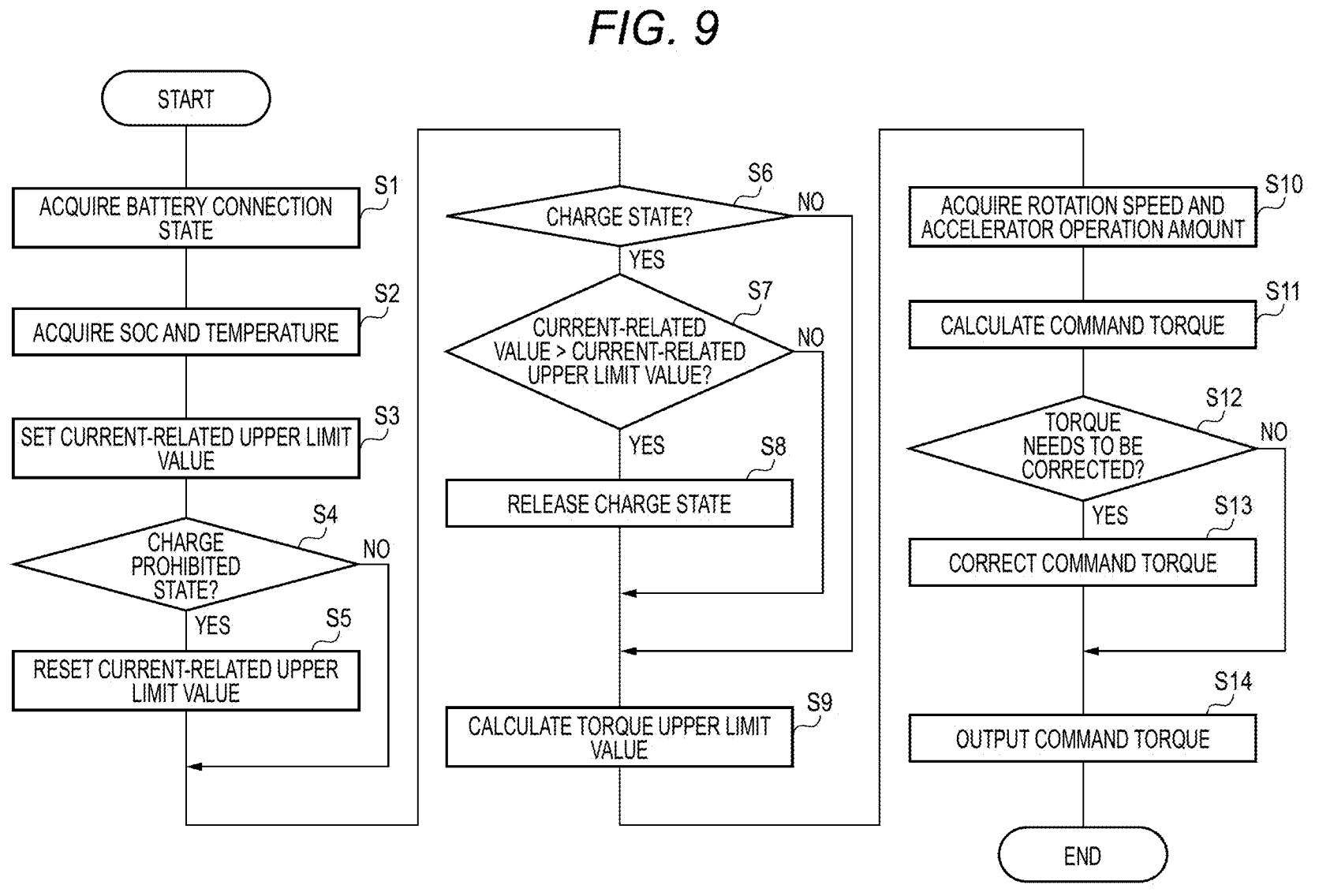

START

S1 — ACQUIRE BATTERY CONNECTION STATE

S2 — ACQUIRE SOC AND TEMPERATURE

S3 — SET CURRENT-RELATED UPPER LIMIT VALUE

S4 — CHARGE PROHIBITED STATE?

YES → S5 — RESET CURRENT-RELATED UPPER LIMIT VALUE

NO

S6 — CHARGE STATE?

NO

YES

S7 — CURRENT-RELATED VALUE > CURRENT-RELATED UPPER LIMIT VALUE?

YES → S8 — RELEASE CHARGE STATE

NO

S9 — CALCULATE TORQUE UPPER LIMIT VALUE

S10 — ACQUIRE ROTATION SPEED AND ACCELERATOR OPERATION AMOUNT

S11 — CALCULATE COMMAND TORQUE

S12 — TORQUE NEEDS TO BE CORRECTED?

YES → S13 — CORRECT COMMAND TORQUE

NO

S14 — OUTPUT COMMAND TORQUE

END

CONTROL METHOD AND CONTROL DEVICE FOR MOTOR OF ELECTRIC VEHICLE, AND ELECTRIC VEHICLE INCLUDING CONTROL DEVICE

CROSS-REFERENCE TO RELATED APPLICATIONS

This application is based on and claims priority under 35 USC 119 from Japanese Patent Application No. 2023-094974 filed on Jun. 8, 2023, the contents of which are incorporated herein by reference.

TECHNICAL FIELD

The present disclosure relates to a control method and control device for a motor of an electric vehicle, and an electric vehicle including the control device.

BACKGROUND ART

JP2010-233396A discloses a control method and a control device for a motor of an electric vehicle, and an electric vehicle including the control device.

According to JP2010-233396A, an upper limit value of a discharge power of a battery is set, and the discharge power of the battery is reduced to the upper limit value or less.

In order to reduce the discharge power of the battery, it is necessary to add an additional function or component to the battery or a battery control circuit electrically connected to the battery, such as incorporating a current limiting function into the battery or the battery control circuit. A general electric vehicle requires a function of reducing the discharge power of the battery in order to electrically protect a battery-related component. Accordingly, it is difficult to freely select and mount various batteries and battery control circuits in the general electric vehicle.

SUMMARY OF INVENTION

The present disclosure provides a control method capable of electrically protecting a battery-related component and expanding options of a battery and a battery control circuit to be mounted.

According to an illustrative aspect of the present disclosure, a control method for a motor of an electric vehicle includes: setting a current-related upper limit value of a current-related value related to a current flowing through a battery of the electric vehicle in accordance with a vehicle state when the electric vehicle is driven by the motor; and calculating a torque upper limit value of a command torque for commanding the motor to maintain a state where the current-related value is equal to or less than the current-related upper limit value, based on an accelerator operation amount input to the electric vehicle and the current-related upper limit value.

According to the present disclosure, a control method for a motor of an electric vehicle calculates a torque upper limit value of a command torque to be issued to a motor such that a current-related value related to a current flowing through a battery is equal to or less than a current-related upper limit value. By calculating the torque upper limit value of the command torque, a battery-related component can be electrically protected even when a battery having a small allowable current is mounted or even when a battery having no current limiting function and a battery control circuit are mounted. Accordingly, the electric vehicle has a function of protecting the battery-related component, and various batteries and battery control circuits can be freely selected and mounted.

Therefore, according to the control method for a motor of an electric vehicle of the present disclosure, the battery-related component can be electrically protected, and options of the mounted battery and the battery control circuit can be expanded.

BRIEF DESCRIPTION OF DRAWINGS

FIG. 4 is a block diagram showing a system for controlling a motor included in the circuit in FIG. 2.

FIG. 5 is a map of an upper limit current when a battery used in a current-related upper limit value setting circuit in FIG. 4 is discharged.

FIG. 9 is a flowchart of motor control performed by the circuit in FIG. 2.

DESCRIPTION OF EMBODIMENTS

Figure 1:
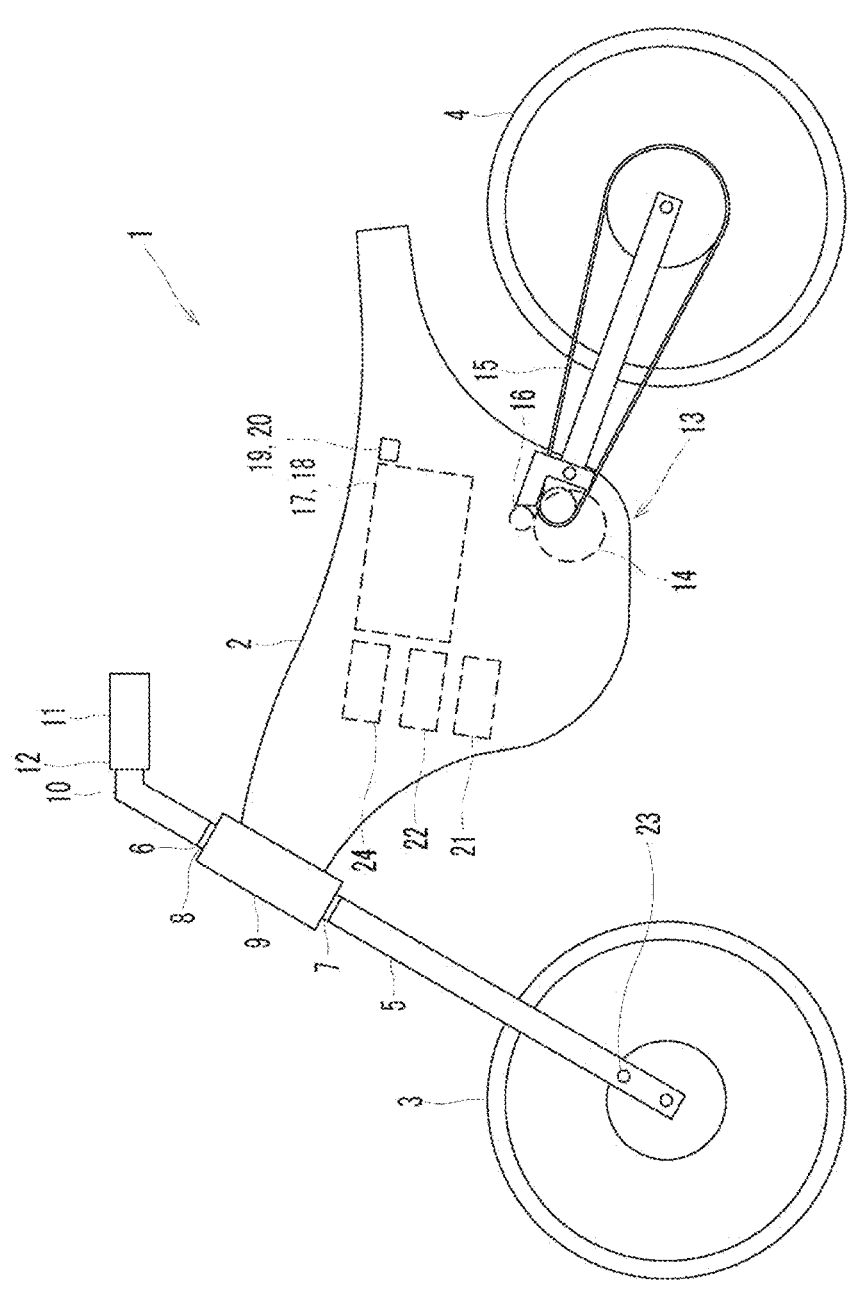
FIG. 1 is a side view of an electric vehicle according to an embodiment of the present disclosure.

Hereinafter, an embodiment of the present disclosure will be described with reference to the accompanying drawings.
Configuration of Electric Vehicle FIG. 1 is a side view of an electric vehicle (hereinafter referred to as an "electric motorcycle") 1 according to an embodiment of the present disclosure. Directions such as a forward direction, a rearward direction, a rightward direction, and a leftward direction in the present embodiment are directions viewed from a driver who rides on the electric motorcycle 1.

The electric motorcycle 1 includes a main body 2 of the electric motorcycle 1, a front wheel 3 disposed in front of the main body 2, and a rear wheel 4 disposed behind the main body 2.

The front wheel 3 is rotatably supported by a lower portion of a front fork 5 extending in an up-down direction. The front fork 5 is supported by a steering shaft 8 via an upper bracket 6 provided at an upper end portion thereof and a lower bracket 7 provided below the upper bracket 6. The steering shaft 8 is pivotally supported by a head pipe 9 attached to the main body 2.

A handlebar 10 extending in a left-right direction is attached to the upper bracket 6. The front wheel 3 is steered with the steering shaft 8 as a rotation axis by a swing operation of the handlebar 10 to the left and right by the driver.

An accelerator grip 11 is rotatably attached to both sides of the handlebar 10. When starting or accelerating the electric motorcycle 1, the driver makes a start request or an acceleration request by rotating the accelerator grip 11. The accelerator grip 11 includes an accelerator grip sensor 12 electrically connected to a control unit 24 to be described later. The accelerator grip sensor 12 detects an accelerator operation amount input by rotating the accelerator grip 11, and transmits a signal including the accelerator operation amount to the control unit 24.

A drive system component 13 that drives the rear wheel 4 is disposed inside the main body 2 in a vehicle width direction in order to drive the electric motorcycle 1. The drive system component 13 includes a motor 14 and a power transmission component 15. The motor 14 generates a driving force when supplied with electric power. In the present embodiment, the motor 14 is a three-phase AC motor. The power transmission component 15 connects an output shaft of the motor 14 and a rear wheel, which is a driving wheel, in a power transmittable manner. The power transmission component 15 includes, for example, a sprocket and a chain, and transmits a driving force of the motor 14 to the rear wheel 4. In addition, the electric motorcycle 1 includes a motor rotation speed sensor 16 electrically connected to the control unit 24 to be described later in the vicinity of the motor 14. The motor rotation speed sensor 16 detects a rotation speed of the motor 14 and transmits a signal including the rotation speed to the control unit 24.

Two chargeable and dischargeable battery packs 17, 18 that supply electric power to the motor 14 are disposed inside the main body 2 in the vehicle width direction. The two battery packs 17, 18 are attachable to and detachable from the main body 2. Each battery pack is chargeable by an external charging device in a state of being detached from the main body 2. The charged battery pack is attached to the main body 2 by a user. In the present embodiment, two battery packs 17, 18 are disposed, but one or three or more battery packs may be disposed.

Battery attachment detection sensors 19, 20 that detect whether the two battery packs 17, 18 are attached are disposed inside the main body 2 in the vehicle width direction. The battery attachment detection sensors 19, 20 detect whether the two battery packs 17, 18 are attached to the main body 2, and transmit a signal indicating whether the two battery packs 17, 18 are attached to the main body 2 to the control unit 24 to be described later. A motor driver 21 is disposed inside the main body 2 in the vehicle width direction.

The motor driver 21 is electrically connected to the motor 14, and controls electric power supplied from the battery packs 17, 18 to the motor 14, thereby controlling a driving torque output from the motor 14.

A switch box 22 is disposed inside the main body 2 in the vehicle width direction. The switch box 22 controls electrical connection between the two battery packs 17, 18 and the motor 14 so as to be able to select a parallel connection state where both of the two battery packs 17, 18 supply electric power to the motor 14 or a single connection state where one of the battery packs 17, 18 supplies electric power to the motor 14.

A wheel speed sensor 23 that detects a rotation speed of the front wheel 3 is disposed below the front fork 5. The wheel speed sensor 23 transmits a signal including the rotation speed of the front wheel 3 to the control unit 24 to be described later.

The control unit 24 is disposed inside the main body 2 in the vehicle width direction. The control unit 24 is electrically connected to electrical components such as the accelerator grip sensor 12, the motor rotation speed sensor 16, the battery attachment detection sensors 19, 20, the motor driver 21, the switch box 22, and the wheel speed sensor 23. The control unit 24 is an integrated circuit that controls the drive system components 13, particularly the motor 14, in accordance with a signal transmitted from the accelerator grip sensor 12 or the like, and includes a processor 24a that performs a control process, a memory 24b that stores a control program, and an input and output interface 24c that transmits and receives a signal to and from the above-described electrical components.

In the present embodiment, the control unit 24 is electrically connected to the two battery packs 17, 18, and performs control to permit charging and discharging. On the other hand, a battery control device that controls charging and discharging of the two battery packs 17, 18 other than the control unit 24 may be disposed inside the main body 2 in the vehicle width direction.

Configuration of Electric Circuit

Figure 2:
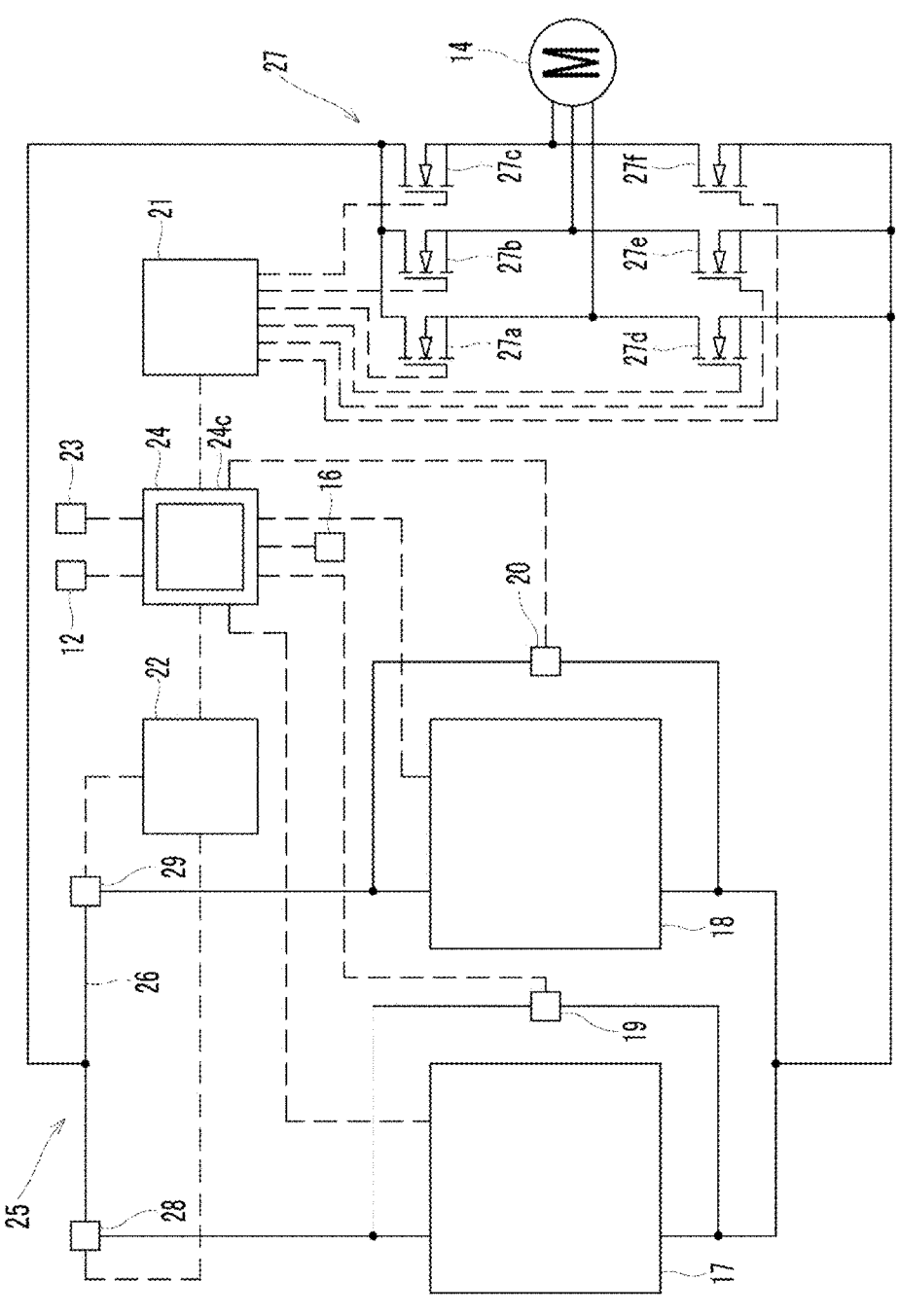
FIG. 2 is a circuit diagram of the electric vehicle in FIG. 1.

FIG. 2 is a circuit diagram of the electric motorcycle 1 in FIG. 1, and particularly shows an electric circuit 25 that electrically connects the motor 14, the two battery packs 17, 18, the motor driver 21, the switch box 22, and the control unit 24.

In the present embodiment, the electric circuit 25 includes a power path 26 that connects the two battery packs 17, 18 in parallel to each other and electrically connects the two battery packs 17, 18 to the motor 14 via an inverter circuit 27 to be described later. The electric power path 26 is an electric path that supplies electric power from the two battery packs 17, 18 to the motor 14 and supplies electric power from the motor 14 to the two battery packs 17, 18.

The electric circuit 25 includes the inverter circuit 27 that adjusts a frequency of AC power supplied from the two battery packs 17, 18 to the motor 14 or supplied from the motor 14 to the two battery packs 17, 18. The inverter circuit 27 includes switching elements 27a to 27f that are connected in a three-phase bridge manner. Each of the switching elements 27a to 27f is a MOSFET, and a gate thereof is electrically connected to the motor driver 21.

Each of the switching elements 27a to 27f have a characteristic of closing so as to conduct between a source and a drain when a voltage is applied to a gate, and opening so as not to conduct between the source and the drain when a voltage is not applied to the gate. Accordingly, the motor driver 21 controls the voltage applied to the gates of the switching elements 27a to 27f to switch the opening and closing of the switching elements 27a to 27f, thereby adjusting the frequency of the AC power supplied from the two battery packs 17, 18 to the motor 14 or supplied from the motor 14 to the two battery packs 17, 18.

The motor driver 21 is an integrated circuit that is electrically connected to the control unit 24, and drives the motor 14 by controlling the inverter circuit 27 in accordance with an electrical signal that is transmitted from the control unit 24 and that includes an instruction to output a command torque to the motor 14.

As described above, by switching the opening and closing of the switching elements 27a to 27f, the motor driver 21 is configured to supply electric power from the two battery packs 17, 18 to the motor 14 to drive the motor 14 when the electric motorcycle 1 travels. By switching the opening and closing of the switching elements 27a to 27f, the motor driver 21 is configured to supply electric power from the motor 14 to the two battery packs 17, 18 to charge the two battery packs 17, 18 during regenerative braking of the electric motorcycle 1.

The two battery packs 17, 18 respectively include battery management units 17f, 18f to be described later, which are electrically connected to the control unit 24. The battery management units 17*f*, 18*f* perform control to permit or prohibit discharging or charging of the battery packs 17, 18, acquire information such as temperatures and SOCs (state of charge) of the battery packs 17, 18, and transmit the information as an electrical signal to the control unit 24.

The electric circuit 25 includes the battery attachment detection sensors 19, 20. The battery attachment detection sensors 19, 20 are electrically connected to positive electrode sides and negative electrode sides of the battery packs 17, 18 to be able to detect potentials of the battery packs 17, 18. The battery attachment detection sensors 19, 20 are electrically connected to the control unit 24, respectively. When detecting the potentials of the battery packs 17, 18, the battery attachment detection sensors 19, 20 transmit electrical signals including the potentials of the battery packs 17, 18 to the control unit 24. The control unit 24 determines that the battery packs 17, 18 are attached based on the fact that the potentials of the battery packs 17, 18 are detected. When the battery attachment detection sensors 19, 20 do not detect the potentials of the battery packs 17, 18, the battery attachment detection sensors 19, 20 transmit, to the control unit 24, electrical signals including that the potentials of the battery packs 17, 18 are not detected. The control unit 24 determines that the battery packs 17, 18 are not attached based on the fact that the potentials of the battery packs 17, 18 are not detected.

In the embodiment shown in FIG. 2, the two battery packs 17, 18 are electrically connected to the power path 26, but only one of the battery packs 17, 18 may be electrically connected to the power path 26. In this case, the control unit 24 determines that only one of the two battery packs 17, 18 is electrically connected to the electric power path 26 based on the potentials of the battery packs 17, 18 transmitted from the battery attachment detection sensors 19, 20.

The electric circuit 25 includes switching elements 28, 29 that are electrically connected to the battery packs 17, 18 and the power path 26. The switching elements 28, 29 are electrically connected to the switch box 22, respectively. The switching elements 28, 29 switch between conduction and interruption between the battery packs 17, 18 and the power path 26 in accordance with electrical signals that include instructions for conduction and interruption and that are transmitted from the switch box 22. In the present embodiment, the switching elements 28, 29 are relay elements, but may be MOSFETs.

The switch box 22 is an integrated circuit that is electrically connected to the control unit 24, and switches between conduction and interruption between the two battery packs 17, 18 and the inverter circuit 27 via the power path 26 by operating the switching elements 28, 29 in accordance with an electrical signal that is transmitted from the control unit 24 and that includes an instruction to switch between conduction and interruption between the two battery packs 17, 18 and the power path 26.

Configuration of Battery Pack

Figure 3:
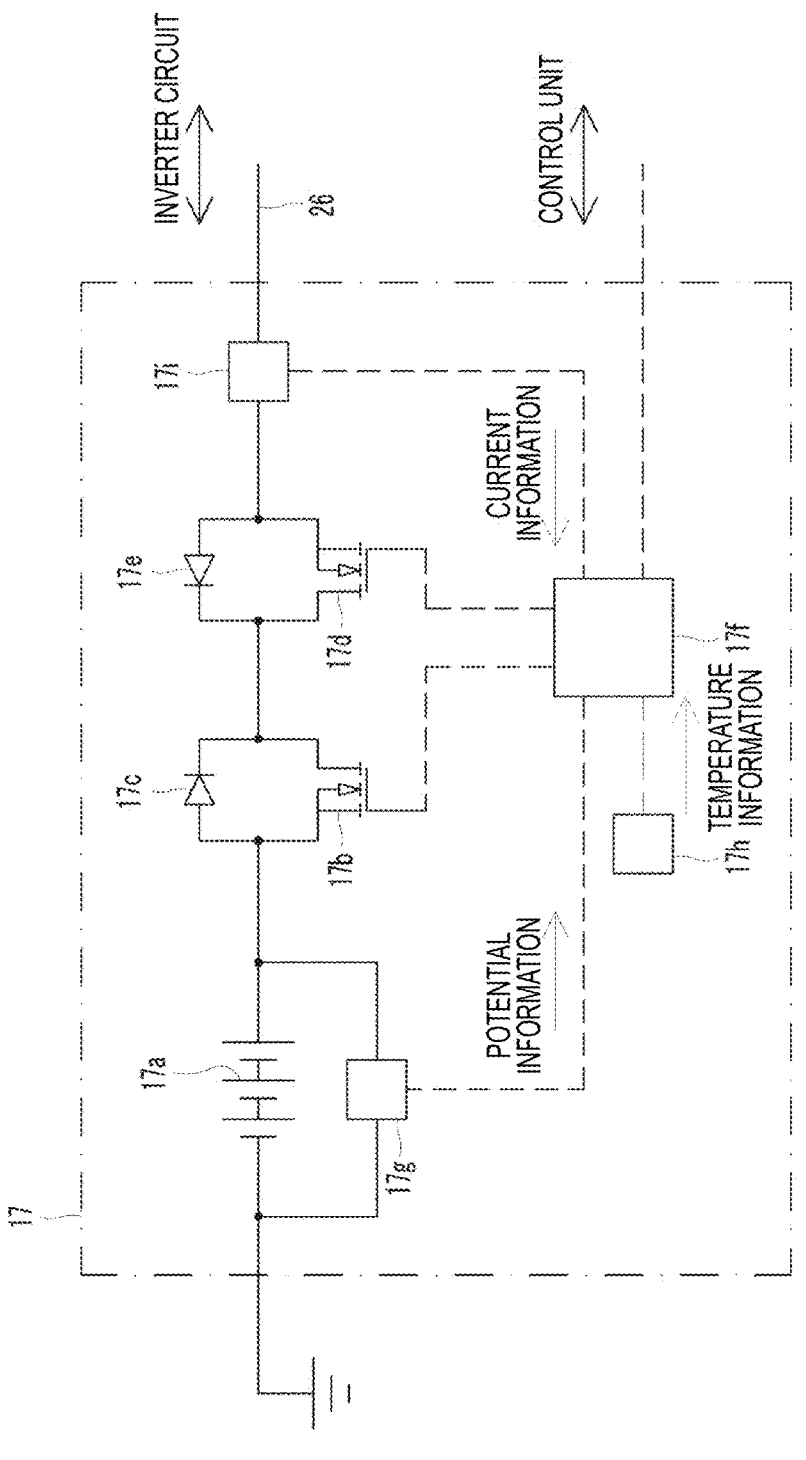
FIG. 3 is a circuit diagram of a battery included in a circuit in FIG. 2.

FIG. 3 is a circuit diagram of the battery pack 17 included in the electric circuit 25 in FIG. 2. In the present embodiment, the battery pack 17 has a general configuration that does not include special specifications. Since the battery pack 18 has the same configuration as the battery pack 17, the description thereof is omitted.

The battery pack 17 includes a battery cell 17*a* that charges and discharges electric power supplied to the motor 14. In the present embodiment, the battery cell 17*a* includes a plurality of battery cells, but may include a single battery cell.

In the present embodiment, the battery pack 17 includes a charging switching element 17*b* electrically connected to the battery cell 17*a*, a discharging rectifier diode 17*c* electrically connected in parallel to the charging switching element 17*b*, a discharging switching element 17*d* electrically connected to the battery cell 17*a* via the charging switching element 17*b* and the discharging rectifier diode 17*c*, and a charging rectifier diode 17*e* electrically connected in parallel to the discharging switching element 17*d*.

The discharging rectifier diode 17*c* allows a current to flow from the battery cell 17*a* to the inverter circuit 27 and prevents the current from flowing from the inverter circuit 27 to the battery cell 17*a*. The charging rectifier diode 17*e* allows a current to flow from the inverter circuit 27 to the battery cell 17*a* and prevents the current from flowing from the battery cell 17*a* to the inverter circuit 27.

The battery pack 17 includes the battery management unit 17*f* electrically connected to the charging switching element 17*b* and the discharging switching element 17*d*. The battery management unit 17*f* switches between opening and closing of the charging switching element 17*b* and the discharging switching element 17*d* to control to permit or prohibit discharging or charging of the battery pack 17. In addition, the battery management unit 17*f* is electrically connected to the control unit 24, receives an electrical signal including an instruction to permit or prohibit discharging or charging of the battery pack 17, and transmits an electrical signal including information such as the temperature and SOC (state of charge) of the battery pack 17 and the current flowing through the battery cell 17*a*.

In the present embodiment, each of the charging switching element 17*b* and the discharging switching element 17*d* is a MOSFET that has a gate electrically connected to the battery management unit 17*f*, but may be other relay elements.

Each of the charging switching element 17*b* and the discharging switching element 17*d* has a characteristic of closing so as to conduct between a source and a drain when a voltage is applied to a gate, and opening so as not to conduct between the source and the drain when a voltage is not applied to the gate. Therefore, by controlling the voltage applied to the gate of the charging switching element 17*b*, the battery management unit 17*f* selectively switches between a chargeable state where the current is allowed to flow from the inverter circuit 27 to the battery cell 17*a* and a charge prohibited state where the current is prohibited from flowing from the inverter circuit 27 to the battery cell 17*a*. More specifically, the battery management unit 17*f* switches the battery pack 17 to the chargeable state by closing the charging switching element 17*b*. The battery management unit 17*f* switches the battery pack 17 to the charge prohibited state by opening the charging switching element 17*b*.

By controlling the voltage applied to the gate of the discharging switching element 17*d*, the battery management unit 17*f* selectively switches between a dischargeable state where the current is allowed to flow from the battery cell 17*a* to the inverter circuit 27 and a discharge prohibited state where the current is prohibited from flowing from the battery cell 17*a* to the inverter circuit 27. More specifically, the battery management unit 17*f* switches the battery pack 17 to the dischargeable state by closing the discharging switching element 17*d*. The battery management unit 17*f* switches the battery pack 17 to the discharge prohibited state by opening the discharging switching element 17*d*.

The battery management unit 17*f* may switch the battery pack 17 to the chargeable state and the dischargeable state by closing both the charging switching element 17b and the discharging switching element 17d. In addition, the battery management unit 17f may switch the battery pack 17 to the charge prohibited state and the discharge prohibited state by opening both the charging switching element 17b and the discharging switching element 17d.

The battery management unit 17f is an integrated circuit that switches the dischargeable state, the discharge prohibited state, the chargeable state, and the charge prohibited state of the battery pack 17 by controlling the voltage applied to the gates of the charging switching element 17b and the discharging switching element 17d.

When the SOC of the battery cell 17a is close to 100%, the battery cell 17a may deteriorate. Therefore, when it is determined that the SOC of the battery cell 17a is close to 100%, the battery management unit 17f opens the charging switching element 17b to switch the battery pack 17 to the charge prohibited state in order to prevent deterioration of the battery cell 17a. When the battery management unit 17f determines that the temperature of the battery pack 17 has reached a temperature condition in which charging is to be prohibited via a temperature sensor 17h to be described later, the battery management unit 17f similarly opens the charging switching element 17b to switch the battery pack 17 to the charge prohibited state in order to prevent deterioration of the battery cell 17a. Further, when the electric motorcycle 1 travels, the battery management unit 17f may open the charging switching element 17b to switch the battery pack 17 to the charge prohibited state in order to prevent unintended charging.

The discharging rectifier diode 17c and the charging rectifier diode 17e each have an allowable current that is an upper limit value of the current flowing through the discharging rectifier diode 17c and the charging rectifier diode 17e. As described above, when the battery pack 17 is in the charge prohibited state and in the dischargeable state, that is, when the charging switching element 17b is opened and the discharging switching element 17d is closed, a large current easily flows through the discharging rectifier diode 17c when the current flows from the battery cell 17a to the inverter circuit 27. Therefore, the current flowing through the discharging rectifier diode 17c may exceed the allowable current. When the current flowing through the discharging rectifier diode 17c exceeds the allowable current, the discharging rectifier diode 17c may be damaged.

The battery pack 17 includes a potential measurement circuit 17g that measures a potential of the battery cell 17a, the temperature sensor 17h that measures the temperature of the battery pack 17, and a current measurement circuit 17i that measures the current flowing through the battery cell 17a.

The potential measurement circuit 17g is electrically connected to a positive electrode and a negative electrode of the battery cell 17a and the battery management unit 17f, and transmits a signal including the measured potential to the battery management unit 17f.

The temperature sensor 17h is electrically connected to the battery management unit 17f, and transmits a signal including the temperature of the battery pack 17 to the battery management unit 17f.

The current measurement circuit 17i is electrically connected to the battery cell 17a and the battery management unit 17f via the charging switching element 17b, the discharging rectifier diode 17c, the discharging switching element 17d, and the charging rectifier diode 17e, and transmits a signal including the measured current to the battery management unit 17f.

The battery management unit 17f is electrically connected to the control unit 24, calculates the SOC of the battery cell 17a from the potential of the battery cell 17a, and transmits an electrical signal including the potential and SOC of the battery cell 17a, the temperature of the battery pack 17, and the current flowing through the battery cell 17a to the control unit 24.

In the present embodiment, the battery management units 17f, 18f transmit an electrical signal including error information to the control unit 24 when there is an abnormality such as a short circuit or a disconnection in relation to circuits in the battery packs 17, 18. When the control unit 24 receives the electrical signal including the error information from any one of the battery management units 17f, 18f, the control unit 24 opens the charging switching elements 17b, 18b and the discharging switching elements 17d, 18d via the battery management units 17f, 18f, respectively, and switches the battery packs 17, 18 having an abnormality to the discharge prohibited state and the charge prohibited state.

Configuration of Switch Box

In the embodiment shown in FIG. 2, the switch box 22 operates the switching elements 28, 29 based on the electrical signal transmitted from the control unit 24 to switch between the parallel connection of the two battery packs 17, 18 and the connection of only one of the two battery packs 17, 18 to the power path 26.

If a potential difference between the battery cells 17a, 18a is equal to or less than a predetermined threshold value based on the potentials of the battery cells 17a, 18a included in the electrical signals transmitted from the battery management units 17f, 18f, the control unit 24 transmits, to the switch box 22, an electrical signal including an instruction to connect the two battery packs 17, 18 in parallel. When the switch box 22 receives the electrical signal including the instruction to connect the two battery packs 17, 18 in parallel from the control unit 24, the switch box 22 closes the switching elements 28, 29 and connects the two battery packs 17, 18 in parallel to the inverter circuit 27 via the power path 26. Since the two battery packs 17, 18 are electrically connected in parallel to the inverter circuit 27 via the electric power path 26, when the electric motorcycle 1 travels, the motor 14 is driven by the electric power supplied from the two battery packs 17, 18, and the two battery packs 17, 18 are charged by electric power supplied from the motor 14 during regenerative braking of the electric motorcycle 1.

When the electric motorcycle 1 travels, if the potential difference between the battery cells 17a, 18a is larger than the predetermined threshold value based on the potentials of the battery cells 17a, 18a included in the electrical signals transmitted from the battery management units 17f, 18f, the control unit 24 transmits, to the switch box 22, an electrical signal including an instruction to connect a battery pack having a higher potential among the two battery packs 17, 18. When the switch box 22 receives, from the control unit 24, the electrical signal including the instruction to connect a battery pack having a higher potential among the two battery packs 17, 18, the switch box 22 closes one of the switching elements 28, 29 and connects the battery pack having a higher potential among the two battery packs 17, 18 to the inverter circuit 27 via the power path 26. Since one of the battery packs 17, 18 is electrically connected to the inverter circuit 27 via the electric power path 26, when the electric motorcycle 1 travels, the motor 14 is driven by the electric power supplied from one of the battery packs 17, 18.

When the electric motorcycle 1 performs regenerative braking, if the potential difference between the battery cells 17*a*, 18*a* is larger than the predetermined threshold value based on the potentials of the battery cells 17*a*, 18*a* included in the electrical signals transmitted from the battery management units 17*f*, 18*f*, the control unit 24 transmits, to the switch box 22, an electrical signal including an instruction to connect a battery pack having a lower potential among the two battery packs 17, 18. When the switch box 22 receives, from the control unit 24, the electrical signal including the instruction to connect a battery pack having a lower potential among the two battery packs 17, 18, the switch box 22 closes one of the switching elements 28, 29 and connect the battery pack having a lower potential among the two battery packs 17, 18 to the inverter circuit 27 via the power path 26. Since one of the battery packs 17, 18 is electrically connected to the inverter circuit 27 via the electric power path 26, when the electric motorcycle 1 performs regenerative braking, one of the battery packs 17, 18 is charged by the electric power supplied from the motor 14.

Even in a case where the motor 14 is driven by the electric power supplied from one of the battery packs 17, 18, or one of the battery packs 17, 18 is charged by the electric power supplied from the motor 14, if it is determined that the potential difference between the battery cells 17*a*, 18*a* is equal to or less than the predetermined threshold value based on the potentials of the battery cells 17*a*, 18*a* included in the electrical signals transmitted from the battery management units 17*f*, 18*f*, the control unit 24 transmits, to the switch box 22, an electrical signal including an instruction to switch a state where only one of the two battery packs 17, 18 is connected to a state where the two battery packs 17, 18 are electrically connected in parallel. Since the switch box 22 receives, from the control unit 24, the electrical signal including the instruction to switch from the state where only one of the two battery packs 17, 18 is connected to the state where the two battery packs 17, 18 are electrically connected in parallel, the switch box 22 closes the switching elements 28, 29 and electrically connects the two battery packs 17, 18 in parallel to the inverter circuit 27 via the power path 26.

Configuration of Control Unit

Figure 4:
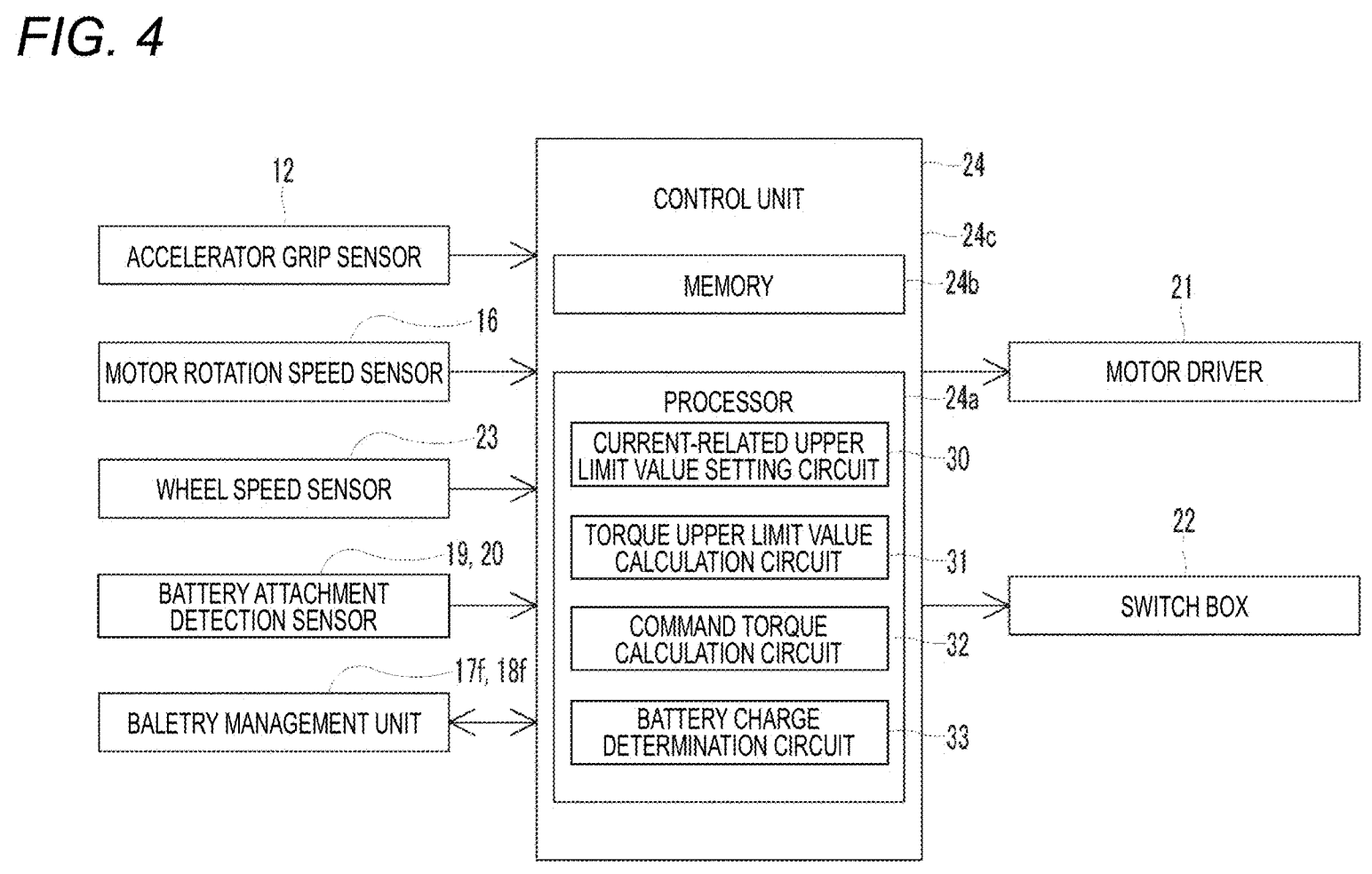

FIG. 4 is a block diagram showing a system for controlling the motor 14 included in the electric circuit 25 in FIG. 2, and particularly shows a control circuit included in the processor 24*a* of the control unit 24.

The functions implemented by the components described in the present specification may be implemented in circuitry or processing circuitry including a general-purpose processor, a specific use processor, an integrated circuit, application specific integrated circuit (ASICs), a central processing unit (CPU), a conventional circuit, and/or a combination thereof, which are programmed to realize the functions described herein. The processor includes a transistor and other circuits, and is regarded as circuitry or processing circuitry. The processor may be a programmed processor that executes a program stored in the memory. In the present specification, the circuitry, the unit, and the means are hardware programmed to implement the described functions or hardware to be executed. The hardware may be any kind of hardware disclosed in the present specification, or any kind of hardware which is programmed to implement the functions described above or is known to be executed. When the hardware is a processor regarded as a circuitry type, the circuitry, means, or unit is a combination of hardware and software used to configure the hardware and the processor.

The processor 21*a* includes a current-related upper limit value setting circuit 30, a torque upper limit value calculation circuit 31, a command torque calculation circuit 32, and a battery charge determination circuit 33.

The current-related upper limit value setting circuit 30 sets an upper limit current of the battery packs 17, 18 based on signals including the SOCs of the battery cells 17*a*, 18*a* and the temperatures of the battery packs 17, 18 transmitted from the battery management units 17*f*, 18*f*, and sets a current-related upper limit value of a current-related value such as electric power related to a current flowing through the battery packs 17, 18 and the temperatures based on the upper limit current.

In the present embodiment, the memory 24*b* of the control unit 24 stores a map of an upper limit current with respect to an SOC and a temperature of a battery pack to be described later. The current-related upper limit value setting circuit 30 sets an upper limit current of the battery packs 17, 18 by using the map, and set a current-related upper limit value of a current-related value such as electric power related to the current flowing through the battery packs 17, 18 and the temperatures based on the upper limit current. The memory 24*b* of the control unit 24 may store an arithmetic expression for calculating the upper limit current based on the SOC and the temperature of the battery pack instead of the map. In this case, the current-related upper limit value setting circuit 30 sets an upper limit current of the battery packs 17, 18 by using the arithmetic expression, and sets a current-related upper limit value of a current-related value such as electric power related to the current flowing through the battery packs 17, 18 and the temperatures based on the upper limit current.

The torque upper limit value calculation circuit 31 calculates a torque upper limit value of a command torque to be issued to the motor 14 via the motor driver 21 in order to maintain a state where the current-related value is equal to or less than the current-related upper limit value, based on the signal including the accelerator operation amount transmitted from the accelerator grip sensor 12 and the current-related upper limit value. More specifically, the torque upper limit value is calculated from the characteristic between the applied current and the output torque of the motor 14 based on the upper limit current related to the current-related upper limit value.

The command torque calculation circuit 32 calculates the command torque based on the accelerator operation amount and the rotation speed of the motor 14 transmitted from the motor rotation speed sensor 16 such that the current-related value is equal to or less than the current-related upper limit value. More specifically, the command torque is calculated as a value equal to or less than the torque upper limit value based on the accelerator operation amount and the rotation speed of the motor 14 such that the current-related value is equal to or less than the current-related upper limit value. When the accelerator operation amount is maximum, the command torque is calculated to increase with an increase in the accelerator operation amount such that the current-related value becomes the current-related upper limit value, and also the command torque is calculated to be limited to be equal to or less than the torque upper limit value.

When the electric motorcycle 1 performs regenerative braking, the battery charge determination circuit 33 determines whether to charge the battery packs 17, 18 in accordance with the current flowing through the battery packs 17, 18. More specifically, when the electric motorcycle 1 performs regenerative braking, if the current flowing through the battery packs 17, 18 is equal to or less than the upper limit current, the battery packs 17, 18 are switched to the chargeable state, and thereby charging is performed. When the electric motorcycle 1 performs regenerative braking, if the current flowing through the battery packs 17, 18 exceeds the upper limit current, the battery packs 17, 18 are switched to the charge prohibited state, and thereby charging is stopped.

The memory 24*b* of the control unit 24 stores processing programs for executing the functions of the current-related upper limit value setting circuit 30, the torque upper limit value calculation circuit 31, the command torque calculation circuit 32, and the battery charge determination circuit 33.

The processor 24*a* implements the functions of the current-related upper limit value setting circuit 30, the torque upper limit value calculation circuit 31, the command torque calculation circuit 32, and the battery charge determination circuit 33 by executing the processing programs for executing the functions of the current-related upper limit value setting circuit 30, the torque upper limit value calculation circuit 31, the command torque calculation circuit 32, and the battery charge determination circuit 33 stored in the memory 21*b*.

In the present embodiment, the processor 24*a* independently includes the current-related upper limit value setting circuit 30, the torque upper limit value calculation circuit 31, the command torque calculation circuit 32, and the battery charge determination circuit 33 as an integrated circuit, and may be a microprocessor in which the functions of the current-related upper limit value setting circuit 30, the torque upper limit value calculation circuit 31, the command torque calculation circuit 32, and the battery charge determination circuit 33 are integrated.

Current-Related Upper Limit Value Setting Circuit

In the present embodiment, the current-related upper limit value setting circuit 30 sets an upper limit current of the current flowing through the battery packs 17, 18 as the current-related upper limit value.

The current-related upper limit value setting circuit 30 sets an upper limit current for the battery packs 17, 18 based on the electrical signal including the SOCs of the battery cells 17*a*, 18*a* and the temperatures of the battery packs 17, 18 transmitted from the battery management units 17*f*, 18*f*, and sets the smallest upper limit current among upper limit currents set for the battery packs 17, 18 as the current-related upper limit value.

The upper limit current of the battery packs 17, 18 varies depending on whether the battery packs 17, 18 are in a discharge state or a charge state. More specifically, when the battery packs 17, 18 are in the discharge state, the upper limit current of the battery packs 17, 18 is set to a larger value than that when the battery packs 17, 18 are in the charge state so that the motor 14 can output a sufficiently larger torque. In order to electrically protect the battery packs 17, 18, the upper limit current of the battery packs 17, 18 in a case where the battery packs 17, 18 are in the charge state is set to a smaller value than that in a case where the battery packs 17, 18 are in the discharge state.

Figure 5:
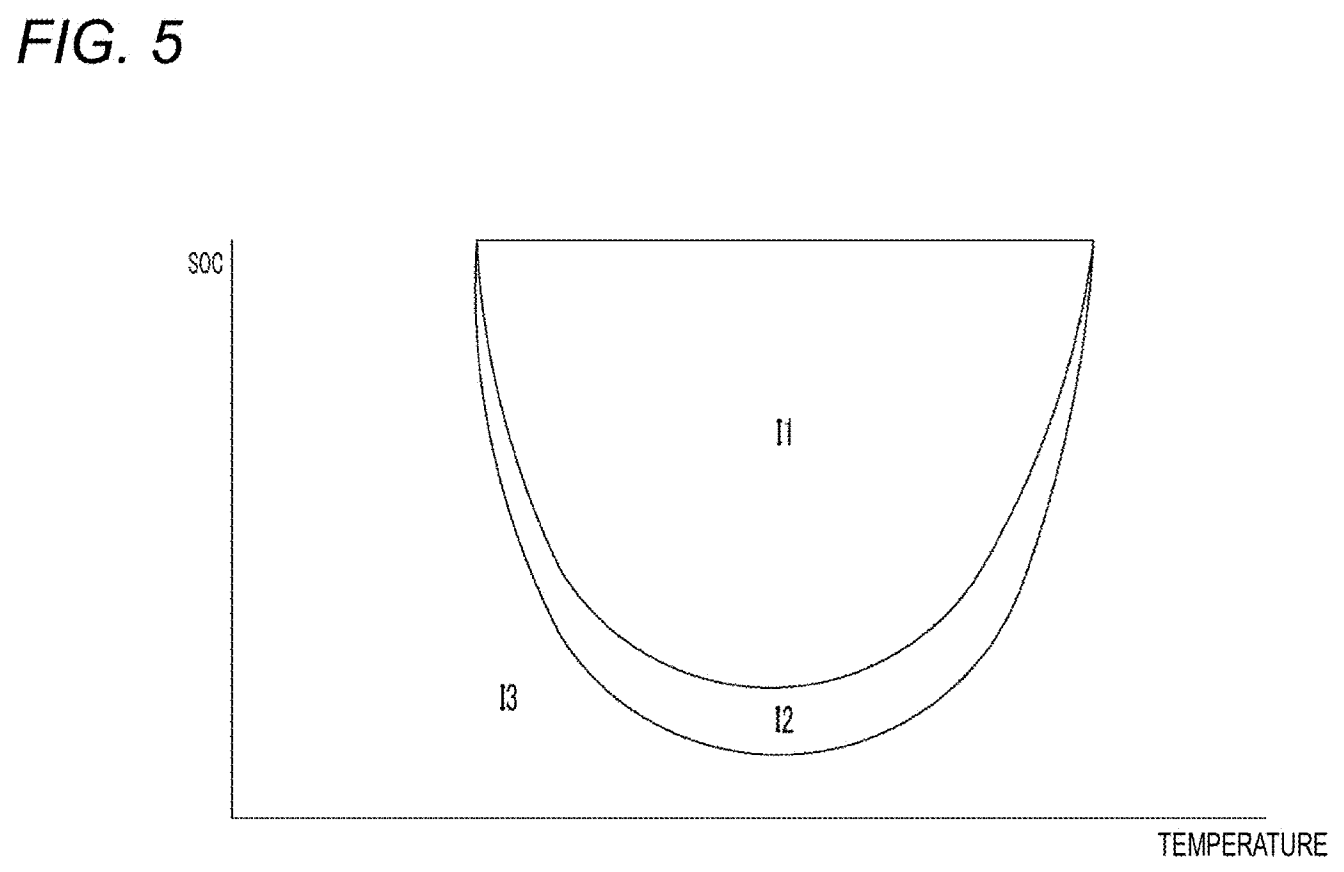

FIG. 5 is a map of the upper limit current when the battery packs 17, 18 used by the current-related upper limit value setting circuit 30 in FIG. 4 are in the discharge state, in which a horizontal axis indicates the temperatures of the battery packs 17, 18 and a vertical axis indicates the SOCs of the battery packs 17, 18. In the map in FIG. 5, regions I1, I2, and I3 of the upper limit currents corresponding to the temperatures and the SOCs of the battery packs 17, 18 are determined. The magnitude of a current value [A] in each of the upper limit current regions I1, I2, and I3 has a relation of I1>I2>I3.

The map in FIG. 5 is stored in the memory 24*b* of the control unit 24. The current-related upper limit value setting circuit 30 sets the upper limit currents in the corresponding regions I1, I2, and I3 for each of the battery packs 17, 18 based on the temperatures and the SOCs of the battery packs 17, 18 using the map in FIG. 5, and sets the minimum value among the upper limit currents of the battery packs 17, 18 as the current-related upper limit value.

Figure 6:
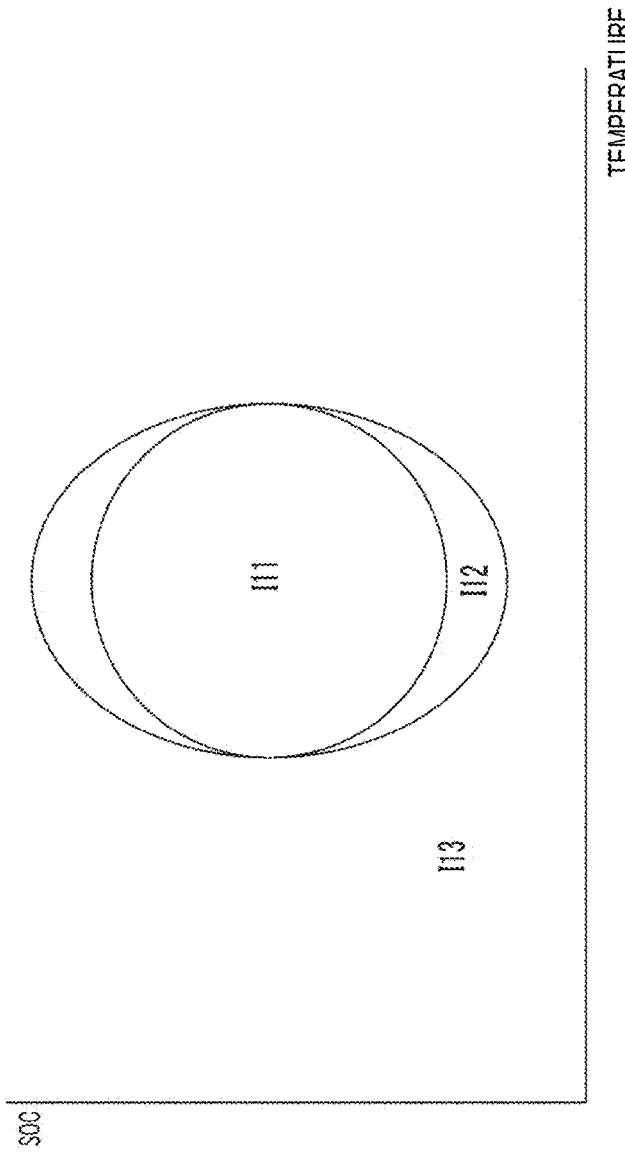
FIG. 6 is a map of an upper limit current when the battery used in the current-related upper limit value setting circuit in FIG. 4 is charged.

FIG. 6 is a map of the upper limit current when the battery packs 17, 18 used by the current-related upper limit value setting circuit 30 in FIG. 4 are in the charge state, in which the horizontal axis indicates the temperatures of the battery packs 17, 18 and the vertical axis indicates the SOCs of the battery packs 17, 18. In the map in FIG. 6, regions I11, I12, and I13 of the upper limit currents corresponding to the temperatures and the SOCs of the battery packs 17, 18 are determined. The magnitude of the current value [A] in each of the upper limit current regions I11, I12, and I13 has a relation of I11>I12>I13.

The map in FIG. 6 is stored in the memory 24*b* of the control unit 24. The current-related upper limit value setting circuit 30 sets the upper limit currents in the corresponding regions I11, I12, and I13 for each of the battery packs 17, 18 based on the temperatures and the SOCs of the battery packs 17, 18 by using the map of FIG. 6, and sets the minimum value among the upper limit currents of the battery packs 17, 18 as the current-related upper limit value.

In the embodiment shown in FIG. 2, when the two battery packs 17, 18 are electrically connected to the electric power path 26, but only one of the battery packs 17, 18 is electrically connected to the electric power path 26, the current-related upper limit value setting circuit 30 sets the upper limit current of the connected battery packs 17, 18 as the current-related upper limit value.

In the present embodiment, when the SOCs of the battery cells 17*a*, 18*a* are close to 100%, when the temperatures of the battery packs 17, 18 reach the temperature condition in which is to be prohibited, or when it is necessary to prevent the battery packs 17, 18 from being unintentionally charged, the battery management units 17*f*, 18*f* open the charging switching elements 17*b*, 18*b* to switch the battery packs 17, 18 to the charge prohibited state in order to prevent the battery cells 17*a*, 18*a* from being overcharged and deteriorated. When the electric motorcycle 1 travels in a state where the charging switching elements 17*b*, 18*b* are open, the battery management units 17*f*, 18*f* close the discharging switching elements 17*d*, 18*d* to switch the battery packs 17, 18 to the dischargeable state. At this time, since the current intensively flows through the discharging rectifier diodes 17*c*, 18*c*, the current flowing through the discharging rectifier diodes 17*c*, 18*c* may exceed the allowable current.

As described above, when the battery packs 17, 18 are in the charge prohibited state and the dischargeable state, the current-related upper limit value setting circuit 30 sets an allowable current of the discharging rectifier diodes 17*c*, 18*c* as the upper limit current of the battery packs 17, 18 in order to electrically protect the discharging rectifier diodes 17*c*, 18*c*. Further, the current-related upper limit value setting circuit 30 sets the allowable current of the discharging rectifier diodes 17*c*, 18*c* to the minimum value of the set upper limit current of the battery packs 17, 18 as the current-related upper limit value.

Torque Upper Limit Value Calculation Circuit

The torque upper limit value calculation circuit 31 calculates, based on the accelerator operation amount transmitted from the accelerator grip sensor 12 and the current-related upper limit value set by the current-related upper limit value setting circuit 30, a torque upper limit value of the command torque to be issued to the motor 14 via the motor driver 21 in order to maintain a state where the current flowing through the battery packs 17, 18 is equal to or less than the upper limit current. More specifically, the torque upper limit value is calculated from the characteristic between the applied current and the output torque of the motor 14 based on the upper limit current related to the current-related upper limit value.

Command Torque Calculation Circuit

The command torque calculation circuit 32 calculates a command torque to be issued to the motor 14 via the motor driver 21 based on the accelerator operation amount transmitted from the accelerator grip sensor 12 and the rotation speed of the motor 14 transmitted from the motor rotation speed sensor 16.

When the command torque exceeds the torque upper limit value calculated by the torque upper limit value calculation circuit 31, the command torque calculation circuit 32 corrects the command torque so that the command torque becomes equal to or less than the torque upper limit value in order to maintain a state where the current flowing through the battery packs 17, 18 becomes equal to or less than the upper limit current.

Figure 7:
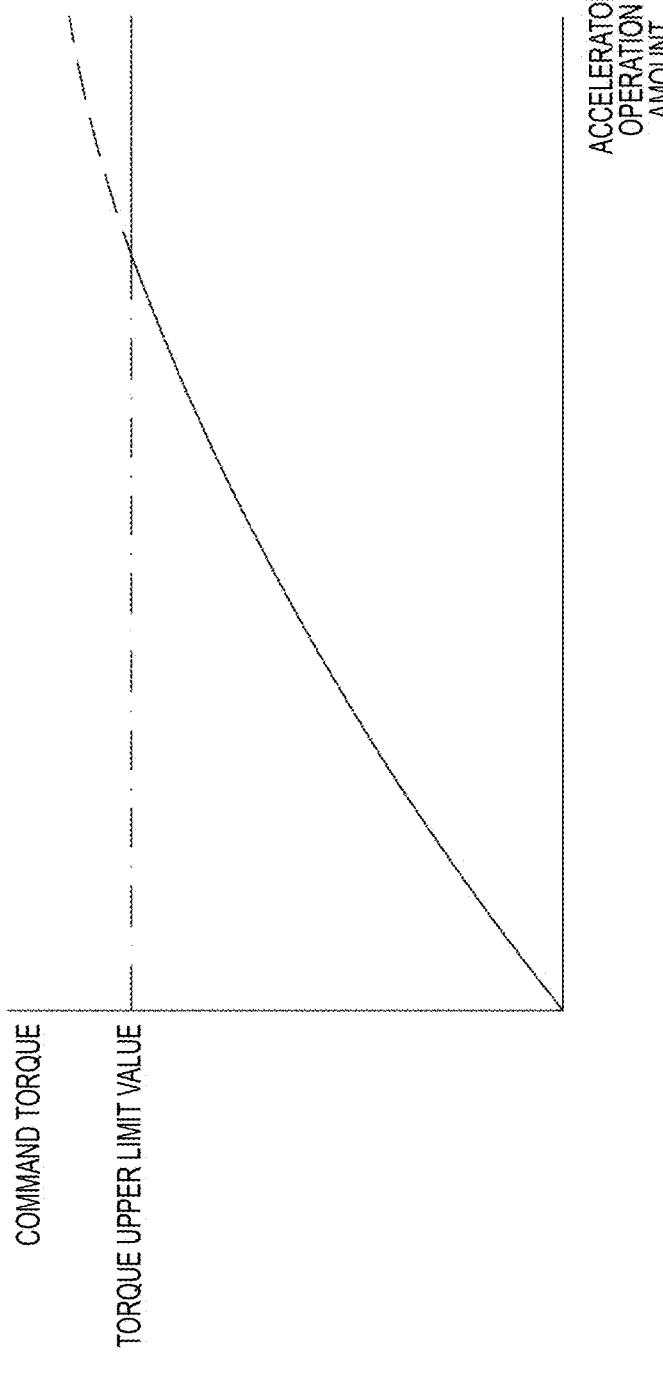
FIG. 7 is a graph showing one embodiment of a command torque corrected by a command torque calculation circuit shown in FIG. 4.

FIG. 7 is a graph showing one embodiment of the command torque corrected by the command torque calculation circuit 32 in FIG. 4, in which the horizontal axis indicates the accelerator operation amount and the vertical axis indicates the command torque. In the graph of FIG. 7, a solid line indicates the transition of the corrected command torque, a one-dot chain line indicates the torque upper limit value calculated by the torque upper limit value calculation circuit 31, and a broken line indicates the transition of the command torque before correction based on the accelerator operation amount. As indicated by the solid line in the graph of FIG. 7, when the command torque reaches the torque upper limit value, the command torque is corrected to a torque upper limit value which is a steady value.

Figure 8:
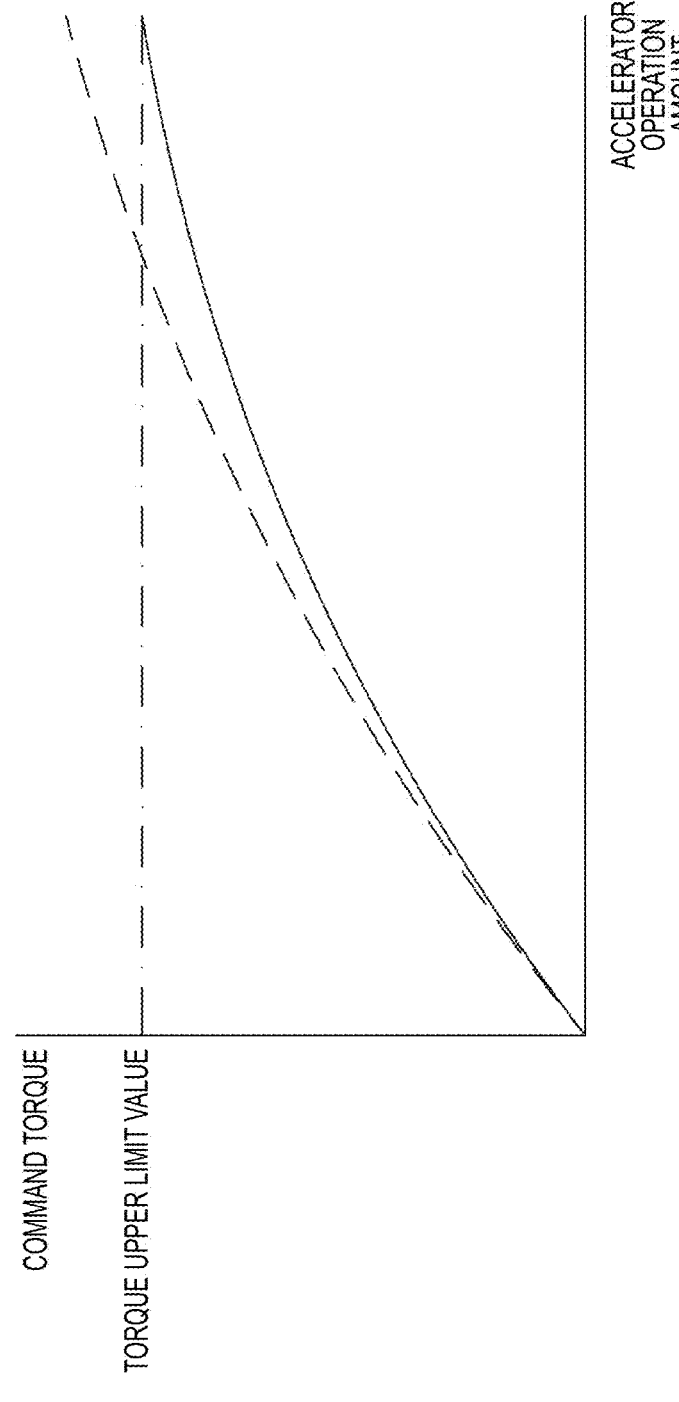
FIG. 8 is a graph showing another embodiment of the command torque corrected by the command torque calculation circuit in FIG. 4.

FIG. 8 is a graph showing another embodiment of the command torque corrected by the command torque calculation circuit 32 in FIG. 4, in which the horizontal axis indicates the accelerator operation amount and the vertical axis indicates the command torque. In the graph of FIG. 8, a solid line indicates the transition of the corrected command torque, a one-dot chain line indicates the torque upper limit value calculated by the torque upper limit value calculation circuit 31, and a broken line indicates the transition of the command torque before correction based on the accelerator operation amount. As indicated by the solid line in the graph of FIG. 8, the command torque is limited to be equal to or less than the torque upper limit value until the accelerator operation amount reaches maximum, and a ratio of increase in accordance with the accelerator operation amount is limited such that the current flowing through the battery packs 17, 18 becomes equal to or less than the upper limit current, and the command torque is corrected to gradually increase as compared to the command torque before correction. More specifically, the command torque is corrected in accordance with the following relation.

$$\text{Command torque} = \text{command torque before correction} \times (\text{current-related upper limit value}/\text{maximum current-related upper limit value})$$

The maximum current-related upper limit value is a maximum value of the current-related upper limit value, and is a value corresponding to the regions I1 and I11 of the upper limit current in the maps shown in FIGS. 5 and 6.

Battery Charge Determination Circuit

When the electric motorcycle 1 performs regenerative braking, the battery charge determination circuit 33 determines whether to charge the battery packs 17, 18 in accordance with the current flowing through the battery packs 17, 18. More specifically, when the electric motorcycle 1 performs regenerative braking, if the current flowing through the battery packs 17, 18 is equal to or less than the upper limit current, the battery management units 17f, 18f close the charging switching elements 17b and 18b, so that the battery packs 17, 18 are switched to the chargeable state, and thereby charging is performed. When the electric motorcycle 1 performs regenerative braking, if the current flowing through the battery packs 17, 18 exceeds the upper limit current, the battery management units 17f, 18f open the charging switching elements 17b and 18b, so that the battery packs 17, 18 are switched to the charge prohibited state, and thereby charging is stopped.

Control Method

A control method executed by the electric circuit 25 shown in FIG. 2 includes drive control for driving the motor 14 by bringing the battery packs 17, 18 into a discharge state where electric power is discharged toward the motor 14, and regeneration control for charging the battery packs 17, 18 by bringing the battery packs 17, 18 into a charge state where electric power is supplied from the motor 14.

FIG. 9 is a flowchart of control of the motor 14 performed using the electric circuit 25 in FIG. 2, and particularly shows a control process executed by the processor 24a. The memory 24b of the control unit 24 stores a program for performing control according to the flowchart shown in FIG. 9.

In step S1, the control unit 24 acquires the potentials of the battery packs 17, 18 transmitted from the battery attachment detection sensors 19, 20, and determines whether the two battery packs 17, 18 are electrically connected to the power path 26, or whether only one of the battery packs 17, 18 is electrically connected to the power path 26.

Next, in step S2, the control unit 24 acquires the SOCs of the battery cells 17a, 18a and the temperatures of the battery packs 17, 18 that are transmitted from the battery management units 17f, 18f.

Next, in step S3, the current-related upper limit value setting circuit 30 of the control unit 24 sets the upper limit current of the current flowing through the battery packs 17, 18 as the current-related upper limit value as described above. More specifically, when the drive control is performed, that is, when the battery packs 17, 18 are in the discharge state, the current-related upper limit value setting circuit 30 sets the upper limit current based on the SOCs of the battery cells 17a, 18a and the temperatures of the battery packs 17, 18 by using the map shown in FIG. 5. When the regeneration control is performed, that is, when the battery packs 17, 18 are in the charge state, the current-related upper limit value setting circuit 30 sets the upper limit current based on the SOCs of the battery cells 17a, 18a and the temperatures of the battery packs 17, 18 by using the map shown in FIG. 6. When the two battery packs 17, 18 are electrically connected to the power path 26, the minimum value of the upper limit currents of the two battery packs 17, 18 is set as the current-related upper limit value. When only one of the battery packs 17, 18 is electrically connected to the power path 26, the upper limit current of the connected battery packs 17, 18 is set as the current-related upper limit value. Further, when the switch box 22 closes one of the switching elements 28, 29 and only one of the battery packs 17, 18 is electrically connected to the inverter circuit 27 via the power path 26, the upper limit current of the connected battery packs 17, 18 is set as the current-related upper limit value.

Next, in step S4, the control unit 24 determines whether the battery packs 17, 18 are in the charge prohibited state when the drive control is performed. More specifically, in a case where the drive control is performed, that is, in a case where the battery packs 17, 18 are in the dischargeable state, when the battery packs 17, 18 are in the charge prohibited state (YES in step S4), the control process proceeds to step S5, whereas when the battery packs 17, 18 are not in the charge prohibited state (NO in step S4), the control process proceeds to step S6 by skipping step S5.

In step S5, since the battery packs 17, 18 are in the dischargeable state and the charge prohibited state, the current-related upper limit value setting circuit 30 sets the allowable current of the discharging rectifier diodes 17c, 18c as the upper limit current of the battery packs 17, 18 for the purpose of electrically protecting the discharging rectifier diodes 17c, 18c as described above. Further, the current-related upper limit value setting circuit 30 resets the allowable current of the discharging rectifier diodes 17c, 18c to the minimum value of the set upper limit currents of the battery packs 17, 18 as the current-related upper limit value. When only one of the battery packs 17, 18 is electrically connected to the power path 26, the current-related upper limit value setting circuit 30 resets the allowable current of the discharging rectifier diodes 17c, 18c of the connected battery packs 17, 18 as the current-related upper limit value.

Next, in step S6, the control unit 24 determines whether regeneration control is performed, that is, whether the battery packs 17, 18 are in a charge state where electric power is supplied from the motor 14. More specifically, when the battery packs 17, 18 are in the charge state (YES in step S6), the control process proceeds to step S7, whereas when the battery packs 17, 18 are not in the charge state (NO in step S6), that is, when the drive control is performed, the control process proceeds to step S9 by skipping steps S7, S8.

In step S7, the battery charge determination circuit 33 of the control unit 24 determines whether the current-related value of the battery packs 17, 18, that is, the current is larger than the current-related upper limit value, that is, the upper limit current. More specifically, when the current flowing through the battery packs 17, 18 is larger than the upper limit current (YES in step S7), the control process proceeds to step S8, whereas when the current flowing through the battery packs 17, 18 is equal to or less than the upper limit current (NO in step S7), the control process proceeds to step S9 by skipping step S8, that is, as described above, the battery packs 17, 18 maintain the charge state, and charging is performed by the regeneration control.

In step S8, since the current flowing through the battery packs 17, 18 is larger than the upper limit current, the battery charge determination circuit 33 transmits an electrical signal including an instruction to open the charging switching elements 17b, 18b to the battery management units 17f, 18f as described above. By opening the charging switching elements 17b and 18b, the battery management units 17f and 18f switch the battery packs 17 and 18 to the charge prohibited state to cancel the charge states of the battery packs 17 and 18, and the charging of the battery packs 17 and 18 is stopped.

Next, in step S9, the torque upper limit value calculation circuit 31 of the control unit 24 calculates a torque upper limit value from the characteristic between the applied current and the output torque of the motor 14 based on the current-related upper limit value, that is, the upper limit current of the battery packs 17, 18, as described above.

Next, in step S10, the control unit 24 acquires the accelerator operation amount transmitted from the accelerator grip sensor 12 and the rotation speed of the motor 14 transmitted from the motor rotation speed sensor 16.

Next, in step S11, the command torque calculation circuit 32 of the control unit 24 calculates a command torque to be issued to the motor 14 via the motor driver 21 based on the accelerator operation amount and the rotation speed of the motor 14 as described above.

Next, in step S12, the command torque calculation circuit 32 determines whether the command torque needs to be corrected. More specifically, when the command torque exceeds the torque upper limit value (YES in step S12), it is determined that the command torque needs to be corrected, and the control process proceeds to step S13, whereas when the command torque is equal to or less than the torque upper limit value (NO in step S12), it is determined that the command torque does not need to be corrected, and the control process skips step S13 and proceeds to step S14.

In step S13, the command torque calculation circuit 32 corrects the command torque so that the command torque becomes equal to or less than the torque upper limit value in order to maintain a state where the current flowing through the battery packs 17, 18 is equal to or less than the upper limit current as described above. In this embodiment, the corrected command torque is calculated by a method of correcting the command torque shown in FIG. 8.

Next, in step S14, the control unit 24 transmits the command torque output from the motor 14 to the motor driver 21 as an electrical signal. The motor driver 21 controls the inverter circuit 27 to drive the motor 14 or controls the inverter circuit 27 to perform regenerative braking of the motor 14, so that the motor 14 outputs a command torque, based on the reception of the electrical signal including the command torque.

The control of the motor 14 including the drive control and the regeneration control is performed along a flow including step S1 to step S14.

Operation and Effect

The electric motorcycle 1 configured as described above has the following features.

A control method for the motor 14 of the electric motorcycle 1 according to the present embodiment includes:

setting a current-related upper limit value of a current-related value related to a current flowing through the battery packs 17, 18 of the electric motorcycle 1 in accordance with a vehicle state when the electric motorcycle 1 is driven by the motor 14; and calculating a torque upper limit value of a command torque to be issued to the motor 14 to maintain a state where the current-related value is equal to or less than the current-related upper limit value, based on an accelerator operation amount input to the electric motorcycle 1 and the current-related upper limit value.

According to the present embodiment, the control method for the motor 14 of the electric motorcycle 1 calculates a torque upper limit value of a command torque to the motor 14 such that a current-related value related to a current flowing through the battery packs 17, 18 is equal to or less than a current-related upper limit value. By calculating the torque upper limit value of the command torque, a battery-related component can be electrically protected even when the battery packs 17, 18 having a small allowable current is mounted or even when the battery packs 17, 18 having no current limiting function are mounted. Accordingly, the electric motorcycle 1 has a function of protecting the battery-related component, and various batteries and battery control circuits can be freely selected and mounted.

Since the torque upper limit value of the command torque is calculated, an influence on the driving feeling is easily reduced as compared with a case where the current of the battery packs 17, 18 are controlled.

When the accelerator operation amount is maximum, the command torque is calculated increase with an increase in the accelerator operation amount such that the current-related value becomes the current-related upper limit value.

According to the present embodiment, the command torque can be changed in accordance with the accelerator operation amount. Since the current-related value related to the current flowing through the battery packs 17, 18 is controlled to be equal to or less than the current-related upper limit value until the accelerator operation amount reaches maximum, the command torque can be increased in accordance with an increase in the accelerator operation amount to be close to the operation feeling of the driver.

The command torque is calculated from the following relation.

$$\text{Command torque} = \text{command torque before correction} \times (\text{current-related upper limit value}/\text{maximum current-related upper limit value}), \text{ where}$$

the command torque before correction is a torque based on the accelerator operation amount input by a driver, and the maximum current-related upper limit value is a maximum value of the current-related upper limit value.

According to the present embodiment, since the command torque is reduced to be equal to or less than the torque upper limit value until the accelerator operation amount reaches the maximum, and the current-related value is equal to or less than the current-related upper limit value, the battery-related component can be electrically protected.

The command torque is calculated based on the accelerator operation amount and the rotation speed of the motor 14.

According to the present embodiment, since the command torque is calculated based on the accelerator operation amount and the rotation speed of the motor 14, it is possible to make the command torque different between when the vehicle starts and when the vehicle travels at a constant speed. For example, by setting the command torque in consideration of the rotation speed of the motor 14, it is possible to prevent the current-related value from exceeding the current-related upper limit value even in a state where the rotation speed at the time of starting or the like is low, and to give an appropriate starting torque to the electric motorcycle 1.

The current-related upper limit value is set based on an upper limit current allowed to flow through the battery packs 17, 18.

According to the present embodiment, the current-related upper limit value is set based on the upper limit current allowed to flow through the battery packs 17, 18, so that the current flowing through the battery packs 17, 18 is controlled to be equal to or less than the upper limit current. Therefore, the battery packs 17, 18 are easily electrically protected. It is also possible to perform control such that the current flowing through the battery packs 17, 18 is equal to or less than the upper limit current by using electric power related to the current, temperatures, or the like as a current-related value.

The upper limit currents are set for the battery packs 17, 18, and the current-related upper limit value is set based on the smallest upper limit current among the upper limit currents set for the battery packs 17, 18.

According to the present embodiment, the current-related upper limit value is set based on the smallest upper limit current among the upper limit currents set for the battery packs 17, 18, so that the current flowing through the battery packs 17, 18 is controlled to be equal to or less than the minimum upper limit current. Therefore, all the battery packs 17, 18 are easily electrically protected.

The control method includes: drive control for driving the motor 14 by bringing the battery packs 17, 18 into a discharge state where electric power is discharged toward the motor 14, and regeneration control for charging the battery packs 17, 18 by bringing the battery packs 17, 18 into a charge state where electric power is supplied from the motor 14 when the electric motorcycle 1 performs regenerative braking.

The upper limit current varies depending on whether the battery packs 17, 18 are in the discharge state or the charge state.

According to the present embodiment, the upper limit current varies depending on whether the battery packs 17, 18 are in the discharge state or the charge state, and is set to an appropriate value. Therefore, even when the battery packs 17, 18 are in the discharge state or the charge state, the battery packs 17, 18 are easily electrically protected.

The regeneration control includes: charging the battery packs 17, 18 when the current flowing through the battery packs 17, 18 is equal to or less than the upper limit current during regenerative braking of the electric motorcycle 1 and the battery packs 17, 18 are in the charge state, and releasing the charge state of the battery packs 17, 18 when the current flowing through the battery packs 17, 18 exceeds the upper limit current during regenerative braking of the electric motorcycle 1.

According to the present embodiment, when the current flowing through the battery packs 17, 18 exceeds the upper limit current during regenerative braking of the electric motorcycle 1, the charge state of the battery packs 17, 18 is released. Therefore, the battery packs 17, 18 are less likely to be overcharged, and the battery packs 17, 18 are easily electrically protected.

The current-related upper limit value is set based on an upper limit current of the circuit element included in the electric circuit 25 electrically connected to the battery packs 17, 18 and the motor 14.

According to the present embodiment, the current-related upper limit value is set based on an upper limit current for electrically protecting the circuit element, so that a current flowing through the circuit element is controlled to be equal to or less than the upper limit current. Therefore, the circuit element is easily electrically protected.

The electric circuit 25 includes: the charging switching elements 17b, 18b and discharging switching elements 17d, 18d that are electrically connected to the battery cells 17a, 18a; and the discharging rectifier diodes 17c, 18c and charging rectifier diodes 17e, 18e that are electrically connected in parallel to the charging switching elements 17b, 18b.

The current-related upper limit value is set to the allowable current of the discharging rectifier diodes 17c, 18c when the charging switching elements 17b and 18b are opened.

According to the present embodiment, when the battery packs 17 and 18 are in a discharge state where electric power is discharged toward the motor 14 and the charging switching elements 17b and 18b are opened, the current-related upper limit value is set to the allowable current of the discharging rectifier diodes 17c and 18c, and thus the discharging rectifier diodes 17c and 18c are easily electrically protected.

In a case where the battery packs 17, 18 are in a chargeable state where a current is allowed to flow from the motor 14 to the battery packs 17, 18 by the charging switching elements 17b and 18b being closed, when a condition for preventing overcharge of the battery cells 17a, 18a is satisfied, the battery packs 17, 18 are switched to a charge prohibited state where the current is prohibited from flowing from the motor 14 to the battery packs 17, 18 due to the charging switching elements 17b and 18b being opened.

According to the present embodiment, in the case where the battery packs 17, 18 are in the chargeable state, when the condition for preventing overcharge of the battery cells 17a, 18a is satisfied, the battery packs 17, 18 are switched to the charge prohibited state, thereby preventing the battery cells 17a, 18a from being overcharged.

The control unit 24 of the motor 14 of the electric motorcycle 1 according to the present embodiment includes: the current-related upper limit value setting circuit 30 that sets a current-related upper limit value of a current-related value related to a current flowing through the battery packs 17, 18 of the electric motorcycle 1 in accordance with a vehicle state when the electric motorcycle 1 is driven by the motor 14; and the torque upper limit value calculation circuit 31 that calculates a torque upper limit value of a command torque to be issued to the motor 14 to maintain a state where the current-related value is equal to or less than the current-related upper limit value, based on the accelerator operation amount input to the electric motorcycle 1 and the current-related upper limit value.

According to the present embodiment, the control unit 24 of the motor 14 of the electric motorcycle 1 calculates a torque upper limit value of a command torque to the motor 14 such that a current-related value related to a current flowing through the battery packs 17, 18 is equal to or less than a current-related upper limit value. By calculating the torque upper limit value of the command torque, a battery-related component can be electrically protected even when the battery packs 17, 18 having a small allowable current is mounted or even when the battery packs 17, 18 having no current limiting function are mounted. Accordingly, the electric motorcycle 1 has a function of protecting the battery-related component, and various batteries and battery control circuits can be freely selected and mounted.

Since the torque upper limit value of the command torque is calculated, an influence on the driving feeling is easily reduced as compared with a case where the current of the battery packs 17, 18 are controlled.

The electric motorcycle 1 of the present embodiment includes the control unit 24.

According to the present embodiment, when the electric motorcycle 1 is driven, the torque upper limit value of the command torque to the motor 14 is calculated such that the current-related value related to the current flowing through the battery packs 17, 18 is equal to or less than the current-related upper limit value. By calculating the torque upper limit value of the command torque, a battery-related component can be electrically protected even when the battery packs 17, 18 having a small allowable current is mounted or even when the battery packs 17, 18 having no current limiting function are mounted. Accordingly, the electric motorcycle 1 has a function of protecting the battery-related component, and various batteries and battery control circuits can be freely selected and mounted.

Since the torque upper limit value of the command torque is calculated, an influence on the driving feeling is easily reduced as compared with a case where the current of the battery packs 17, 18 are controlled. For example, when the command torque is equal to or less than the torque upper limit value, the influence on the driving feeling is easily reduced by issuing the command torque to the motor 14 without reducing the command torque. Further, when the command torque is larger than the torque upper limit value, the command torque is corrected to be reduced, and the corrected command torque is issued to the motor 14, so that the battery-related component can be electrically protected. In particular, according to a method of correcting the command torque shown in FIG. 8, the command torque is less likely to suddenly change in the vicinity of the torque upper limit value, and the influence on the driving feeling is easily reduced.

Other Embodiments

The present disclosure is not limited to the configuration of the above-described embodiment, and various modifications can be made.

In the above-described embodiment, the electric vehicle 1 is an electric motorcycle, and may be a three-wheeled vehicle or a four-wheeled vehicle. Preferably, the present invention can be suitably used for a straddle vehicle that is lighter than a four-wheel vehicle in which right and left wheels are disposed at an interval in the vehicle width direction and that has a larger influence on the driving feeling. The straddle vehicle means a type of vehicle in which the driver sits on a straddle seat such that both legs of the driver are positioned on both left and right sides of the vehicle in a riding posture.

In the above-described embodiments, the two battery packs 17, 18 are connected in parallel, and may be connected in series. A single battery pack may be electrically connected to a power path.

In the above-described embodiments, the two battery packs 17, 18 are attachable to and detachable from the main body 2, and may be non-detachably mounted on the main body 2.

In the above-described embodiments, the upper limit current of the battery packs 17, 18 is set as the current-related upper limit value, but a value related to the current flowing through the battery packs 17, 18, for example, an upper limit value of electric power, temperature, or the like that increases as the current increases, may be set as the current-related upper limit value.

In the above-described embodiments, when the battery packs 17, 18 are in the charge prohibited state and in the dischargeable state, the current-related upper limit value setting circuit 30 sets an allowable current of the discharging rectifier diodes 17c, 18c as the upper limit current of the battery packs 17, 18 in order to electrically protect the discharging rectifier diodes 17c, 18c. However, when the battery packs 17, 18 are in the discharge prohibited state and in the chargeable state, the current-related upper limit value setting circuit 30 may set an allowable current of the charging rectifier diodes 17e and 18e as the upper limit current of the battery packs 17, 18 in order to electrically protect the charging rectifier diodes 17e and 18e from excessive discharge of the battery packs 17, 18.

The present disclosure can be applied not only to an electric vehicle but also to a hybrid vehicle having a mode in which the vehicle travels by a motor. A vehicle structure, that is, a layout of components such as a battery pack or a motor may be other than the arrangement relation disclosed in the above-described embodiments. For example, the motor may be an in-wheel motor, and the battery pack may be mounted on a device other than the main body.

In the above-described embodiments, the electric motor-cycle includes the electric circuit 25, and may include an electric circuit with another configuration. For example, a control unit may have some or all of the functions of a battery management unit. Instead of a switch box, the control unit may have a function of the switch box and control the electrical connection between a battery pack and an inverter circuit via a power path by switching opening and closing of a switching element. Further, the switch box may have a part of the functions of the control unit.

A first aspect of the present disclosure provides a control method for a motor of an electric vehicle. The method includes: setting a current-related upper limit value of a current-related value related to a current flowing through a battery of the electric vehicle in accordance with a vehicle state when the electric vehicle is driven by the motor; and calculating a torque upper limit value of a command torque for commanding the motor to maintain a state where the current-related value is equal to or less than the current-related upper limit value, based on an accelerator operation amount input to the electric vehicle and the current-related upper limit value.

A second aspect of the present disclosure provides the control method according to the first aspect. When the accelerator operation amount is maximum, the command torque is calculated to increase with an increase in the accelerator operation amount such that the current-related value becomes the current-related upper limit value.

A third aspect of the present disclosure provides the control method according to the second aspect.

The command torque is calculated from the following relation.

$$\text{Command torque}=\text{command torque before correction}\times(\text{current-related upper limit value/maximum current-related upper limit value}), \text{ where}$$

the command torque before correction is a torque based on the accelerator operation amount input by a driver, and the maximum current-related upper limit value is a maximum value of the current-related upper limit value.

A fourth aspect of the present disclosure provides the control method according to the first aspect or the second aspect. The command torque is calculated based on the accelerator operation amount and a rotation speed of the motor.

A fifth aspect of the present disclosure provides the control method according to any one of the first to fourth aspects. The current-related upper limit value is set based on an upper limit current allowed to flow through the battery.

A sixth aspect of the present disclosure provides the control method according to any one of the first to fifth aspects. When the battery includes a plurality of batteries electrically connected in parallel. The current-related upper limit value is set for each of the plurality of batteries. The current-related upper limit value is set based on the smallest current-related upper limit value among current-related upper limit values set for each of the plurality of batteries.

A seventh aspect of the present disclosure provides the control method according to any one of the first to sixth aspects. The control method further includes: drive control for driving the motor by bringing the battery into a discharge state where electric power is discharged toward the motor;

and regeneration control for charging the battery by bringing the battery into a charge state where electric power is supplied from the motor during regenerative braking of the electric vehicle. The current-related upper limit value varies depending on whether the battery is in the discharge state or the charge state.

An eighth aspect of the present disclosure provides the control method according to the seventh aspect. The regeneration control includes: charging the battery by bringing the battery into the charge state when the current-related value is equal to or less than the current-related upper limit value during the regenerative braking of the electric vehicle; and releasing the charge state of the battery when the current-related value exceeds the current-related upper limit value during regenerative braking of the electric vehicle.

A ninth aspect of the present disclosure provides the control method according to any one of the first to eighth aspects. The current-related upper limit value is set based on an upper limit current of a circuit element included in an electric circuit electrically connected to the battery and the motor.

A tenth aspect of the present disclosure provides the control method according to the ninth aspect. The electric circuit includes: a switching element electrically connected to the battery; and a diode electrically connected in parallel to the switching element. The current-related upper limit value is set to an allowable current of the diode when the switching element is opened.

An eleventh aspect of the present disclosure provides the control method according to the tenth aspect. In a case where the battery is in a chargeable state where a current is allowed to flow from the motor to the battery by the switching element being closed, when a condition for preventing overcharge of the battery is satisfied, the battery is switched to a charge prohibited state where the current is prohibited from flowing from the motor to the battery by the switching element being opened.

A twelfth aspect of the present disclosure provides a control device for a motor of an electric vehicle. The control device includes: a current-related upper limit value setting unit configured to set a current-related upper limit value of a current-related value related to a current flowing through a battery of the electric vehicle in accordance with a vehicle state when the electric vehicle is driven by the motor; and a torque upper limit value calculation unit configured to calculate a torque upper limit value of a command torque for commanding the motor to maintain a state where the current-related value is equal to or less than the current-related upper limit value, based on an accelerator operation amount input to the electric vehicle and the current-related upper limit value.

A thirteenth aspect of the present disclosure provides an electric vehicle including the control device according to the twelfth aspect.

What is claimed is:

1. A control method for a motor of an electric vehicle, the method comprising:

setting a current-related upper limit value of a current-related value related to a current flowing through a battery of the electric vehicle in accordance with a vehicle state when the electric vehicle is driven by the motor; and calculating a torque upper limit value of a command torque for commanding the motor to maintain a state where the current-related value is equal to or less than the current-related upper limit value, based on an accelerator operation amount input to the electric vehicle and the current-related upper limit value, wherein when the accelerator operation amount is maximum, the command torque is calculated such that the current-related value becomes the current-related upper limit value, and the command torque is controlled to increase with an increase in the accelerator operation amount until the accelerator operation amount reaches the maximum.

2. The control method according to claim 1, wherein the command torque is calculated from following relation, $$\text{command torque} = \text{command torque before correction} \times (\text{current-related upper limit value}/\text{maximum current-related upper limit value}), \text{ where}$$

the command torque before correction is a torque based on the accelerator operation amount input by a driver, and the maximum current-related upper limit value is a maximum value of the current-related upper limit value.

3. The control method according to claim 1, wherein the command torque is calculated based on the accelerator operation amount and a rotation speed of the motor.

4. The control method according to claim 1, wherein the current-related upper limit value is set based on an upper limit current allowed to flow through the battery.

5. The control method according to claim 1, wherein when the battery includes a plurality of batteries electrically connected in parallel, the current-related upper limit value is set for each of the plurality of batteries, and the current-related upper limit value is set based on a smallest current-related upper limit value among current-related upper limit values set for each of the plurality of batteries.

6. The control method according to claim 1, further comprising:

drive control for driving the motor by bringing the battery into a discharge state where electric power is discharged toward the motor; and regeneration control for charging the battery by bringing the battery into a charge state where electric power is supplied from the motor during regenerative braking of the electric vehicle, wherein the current-related upper limit value varies depending on whether the battery is in the discharge state or the charge state.

7. The control method according to claim 6, wherein the regeneration control includes:

charging the battery by bringing the battery into the charge state when the current-related value is equal to or less than the current-related upper limit value during the regenerative braking of the electric vehicle; and stopping charging the battery when the current-related value exceeds the current-related upper limit value during the regenerative braking of the electric vehicle.

8. The control method according to claim 1, wherein the battery includes a plurality of batteries electrically connected in parallel, the electric vehicle includes:

a switch configured to switch between a parallel connection of the plurality of batteries to connect the parallel connection with the motor and a connection of one of the plurality of batteries with the motor; and an electric circuit electrically connected to the battery, the motor, and the switch, and the current-related upper limit value is set based on an upper limit current of a circuit element included in the electric circuit whose connection state is switched by the switch.

9. The control method according to claim 8, wherein the electric circuit includes:

a switching element electrically connected to the battery; and a diode electrically connected in parallel to the switching element, and the current-related upper limit value is set to an allowable current of the diode when the switching element is opened.

10. The control method according to claim 9, wherein in a case where the battery is in a chargeable state where a current is allowed to flow from the motor to the battery by the switching element being closed, when a condition for preventing overcharge of the battery is satisfied, the battery is switched to a charge prohibited state where the current is prohibited from flowing from the motor to the battery by the switching element being opened.

11. An electric vehicle comprising a control device configured to execute the control method according to claim 1.

12. The control method according to claim 1, wherein a ratio of increasing in accordance with the accelerator operation amount is suppressed until the accelerator operation amount reaches the maximum.

13. The control method according to claim 1, wherein the command torque based on the accelerator operation amount varies depending on different rotation speeds of the motor.

14. The control method according to claim 1, wherein the command torque based on the accelerator operation amount varies between when the electric vehicle starts and when the electric vehicle travels at a constant speed.

15. The control method according to claim 1, wherein the torque upper limit value refers to a torque that corresponds to the current-related upper limit when the accelerator operation amount reaches maximum, the command torque is controlled such that the torque does not reach the torque upper limit value until the accelerator operation amount reaches the maximum, the torque is controlled such that the command torque increases as the accelerator operation amount increases, the command torque at a time when the accelerator operation amount reaches the maximum, is the torque that results from motor operation at the current-related upper limit, and the torque upper limit value is set in accordance with the current-related upper limit and is independent of the accelerator operation amount.

16. The control method according to claim 1, wherein the command torque is corrected to be equal to or less than the torque upper limit value until the accelerator operation amount reaches the maximum, and the corrected command torque increasing in accordance with the accelerator operation amount has an increase ration that gradually increases as compared to the command torque before correction.

17. The control method according to claim 1, wherein the electric vehicle includes:

a charging switching element electrically connected to the battery; and a discharging diode electrically connected in parallel to the charging switching element, the discharging diode being configured to allow a current to flow from the battery to the motor and prevent the current from flowing from the motor to the battery, the current-related upper limit value is set at an allowable current of the discharging diode in a state where the charging switching element is open.

18. A control method for a motor of an electric vehicle, the electric vehicle including: the motor; a plurality of batteries electrically connected in parallel; and a switch configured to selectively switch the batteries to be connected to the motor, the method comprising:

setting a current-related upper limit value of a current-related value related to a current flowing through a battery of the electric vehicle in accordance with a vehicle state when the electric vehicle is driven by the motor; and calculating a torque upper limit value of a command torque for commanding the motor to maintain a state where the current-related value is equal to or less than the current-related upper limit value, based on an accelerator operation amount input to the electric vehicle and the current-related upper limit value, wherein the current-related upper limit value is switched based on a connection state of the batteries switched by the switch.

19. A control method for a motor of an electric vehicle, the electric vehicle including: the motor; a battery; a charging switching element electrically connected to the motor and the battery; and a discharging diode electrically connected in parallel to the charging switching element, the discharging diode being configured to allow a current to flow from the battery to the motor and prevent the current from flowing from the motor to the battery, the method comprising:

setting a current-related upper limit value of a current-related value related to a current flowing through a battery of the electric vehicle in accordance with a vehicle state when the electric vehicle is driven by the motor; and calculating a torque upper limit value of a command torque for commanding the motor to maintain a state where the current-related value is equal to or less than the current-related upper limit value, based on an accelerator operation amount input to the electric vehicle and the current-related upper limit value, wherein the current-related upper limit value is set at an allowable current of the discharging diode in a state where the charging switching element is open.

\* \* \* \* \*